United States Patent Office 3,280,182
Patented Oct. 18, 1966

3,280,182
OXIDATION OF ACROLEIN OR METHACROLEIN OVER ANTIMONY MOLYBDATE, COBALT MOLYBDATE OR TIN MOLYBDATE IN THE PRESENCE OF ARSENIC OR ARSENIC OXIDE
Edward James Gasson, Epsom Downs, Surrey, and Rowland Harris Jenkins, West Ewell, Surrey, England, assignors to The Distillers Company Limited, Edinburgh, Scotland, a British company
No Drawing. Filed Mar. 18, 1963, Ser. No. 266,064
Claims priority, application Great Britain, Apr. 10, 1962, 13,677/62
16 Claims. (Cl. 260—530)

The present invention relates to the production of unsaturated aliphatic acids such as acrylic acid and methacrylic acid.

According to the present invention the process for the production of acrylic acid or methacrylic acid comprises reacting at an elevated temperature in the vapour phase acrolein or methacrolein, or a compound which gives rise to acrolein or methacrolein under the reaction conditions, with molecular oxygen in the presence of arsenic or an arsenic oxide over an oxidation catalyst comprising a molybdate of antimony, cobalt or tin.

Propylene may be employed as a compound which gives rise to acrolein under the reaction conditions and isobutene may be employed as a compound which gives rise to methacrolein under the reaction conditions. When the starting material is an olefine such as propylene or isobutene, the reaction product consists of the unsaturated acid with the corresponding unsaturated aliphatic aldehyde. Thus propylene is converted into a mixture of acrylic acid and acrolein. The preferred starting materials are propylene and/or acrolein.

The reaction may be carried out in the presence of arsenic in various ways. Thus the oxidation catalyst itself may initially contain arsenic, or alternatively arsenic oxide or elemental arsenic may be supplied to the reaction with the reactant feed. Also a combination of both embodiments may be employed whereby loss of arsenic due to vaporisation from an arsenic containing catalyst is replaced by the introduction of fresh arsenic oxide or elemental arsenic into the reactant feed.

Arsenic containing catalysts may be prepared by admixture of arsenic or an arsenic oxide with antimony, cobalt or tin molybdate. Alternatively the oxidation catalyst may be conveniently prepared by co-precipitation from mixed solutions of arsenic salt and the catalyst metal molybdate. For example a suitable material may be prepared by co-precipitation from an aqueous solution containing arsenate/arsenite, molybdate and antimony cobalt or tin ions followed by thermal decomposition of the precipitate. The proportion of arsenic in the final material may vary between moderately wide limits and is dependent largely on the reaction conditions to be employed.

The reaction may be carried out in any suitable manner, for instance as a fixed bed process, or as a fluidised bed process.

The proportion of aldehyde or olefine in the feed may vary within wide limits, for example between 1 and 20% by volume, and preferably between about 2 and 10% by volume.

The concentration of oxygen in the feed may also vary within moderately wide limits, for example between 1 and 20% by volume and preferably between 2 and 15% by volume. The oxygen may be diluted with inert gases, and may be, for example supplied as air.

It is preferred to carry out the reaction in the presence as diluent, of a gas or vapour which is substantially inert under the conditions of reaction for example nitrogen, propane, butane, isobutene, carbon dioxide, steam or mixtures thereof. The preferred diluents are nitrogen or steam or mixtures thereof. The concentration of the steam when used may vary within wide limits, for instance between 20 and 60% by volume of the feed.

The reaction is carried out at an elevated temperature, for instance between 250° and 600° C. and preferably between 300 and 500° C.

The contact time may be for example in the range 1–30 seconds.

The unsaturated acid may be recovered from the reaction products in any suitable manner, for example by extraction with a solvent such as water.

The process of the invention is further illustrated by the following examples in which all parts quoted are parts by weight.

EXAMPLE 1

A solution of cobalt nitrate (291 parts) in water (120 parts) was heated to 60° C. and stirred.

Ammonium arsenate (16.7 parts) was dissolved in water (50 parts) and ammonium molybdate (176.5 parts) was dissolved in distilled water (520 parts) at 60°.

The three solutions were mixed, well stirred, and aqueous ammonia (5.38 N; 240 parts) added during 30 minutes, the temperature being maintained at 55°–60° C. Stirring was continued for 15 minutes after the addition of ammonia and the precipitate was then filtrated and washed twice by resuspension in distilled water (500 parts). The catalyst was dried in an oven at 110° C. heated at 400° C. for 16 hours and pelleted with the addition of 2% graphite as lubricant. Finally the pellets were heated at 600° C. for 16 hours. The catalyst had an atomic ratio of Co:As=10:1.

A gaseous mixture of 10% by volume of propylene, 50% by volume of air and 40% by volume of steam was passed over the catalyst maintained in a reactor at 450° C. the contact time being 3.6 seconds.

Of the propylene fed to the reactor, 21.0% was converted to acrylic acid, 4.7% to acrolein and 6.0% to carbon dioxide. The yield of acrylic acid based on propylene consumed was 44.6%.

EXAMPLE 2

Cobalt molybdate catalyst was prepared as described in Example 1 except that no ammonium arsenate was included in the preparation.

A gaseous mixture of 10% by volume of propylene, 50% by volume of air and 40% by volume of steam together with arsenious oxide (3.6 m.gm./litre of reactant mixture) was passed over the catalyst maintained at 479° C. in a reactor, the contact time being 3.3 seconds.

Of the propylene fed to the reactor, 18.1% was converted to acrylic acid, 6.0% to acrolein and 5.5% to carbon dioxide. The yield of acrylic acid based on propylene consumed was 43.5%.

EXAMPLE 3

190 parts by weight of powdered tin metal were slowly added to a well-stirred solution of 800 parts by volume of nitric acid (S.G. 1.42) dissolved in 3200 parts by weight of water. During the addition, the acid was maintained at its boiling point. The acid mixture was boiled with stirring until no more brown nitrous fumes were evolved, cooled to ca. 50° C. and filtered. The precipitate was washed with distilled water, made into a slurry with a little distilled water and a paste of 11.5 parts by weight of molybdenum trioxide with water, was added. The mixture was thoroughly stirred, excess water removed by filtration, and the residue dried at 100° C. The resulting powder was ground down to pass 30 mesh (B.S.S.) mixed with 2% by weight of graphite and pelleted.

The catalyst was then heat treated at 750° C. for 16 hours, and finally at 1000° C. for 16 hours, and had a nominal atomic ratio of tin/molybdenum of 20.

The catalyst was placed in a reactor maintained at 406° C. together with arsenic pentoxide (ca. 6% w./w.) and a gaseous mixture of 10% by volume of propylene, 50% by volume of air and 40% by volume of steam was passed over the catalyst, the contact time being 4 seconds. Of the propylene fed, 18.4% was converted to acrylic acid, 11.9% was converted to acrolein and 3.8% to carbon dioxide.

EXAMPLE 4

323 parts of antimony pentoxide and 144 parts of molybdenum trioxide were well-mixed in powder form, pelleted and heat-treated at 500° C. for 16 hours. The pellets were mechanically mixed with 50 parts of arsenic pentoxide and a gaseous mixture of methacrolein 7.5 parts by volume, steam 42.5 parts by volume and air 50 parts by volume passed over the catalytic mixture at 350° and 4 seconds contact time. Of the methacrolein fed to the reactor, 23% was converted to methacrylic acid and 44% was recovered. The efficiency of conversion was 41%.

We claim:

1. A process for the production of unsaturated aliphatic carboxylic acid selected from the group consisting of acrylic acid and methacrylic acid which comprises reacting at a temperature in the range of from about 250° to about 600° C. in the vapour phase a compound selected from the group consisting of acrolein and methacrolein with molecular oxygen in the presence of a material selected from the group consisting of arsenic and an arsenic oxide over an oxidation catalyst selected from the group consisting of antimony molybdate, cobalt molybdate and tin molybdate.

2. A process as claimed in claim 1 wherein at least some of the acrolein is formed from propylene under the reaction conditions.

3. A process as claimed in claim 1 wherein at least some of the methacrolein is formed from isobutene under the reaction conditions.

4. A process as claimed in claim 1 wherein the material selected from the group consisting of arsenic and an arsenic oxide is supplied in admixture with said compound.

5. A process as claimed in claim 1 wherein the material selected from the group consisting of arsenic and an oxide of arsenic is supplied to the reaction in admixture with the oxidation catalyst.

6. A process as claimed in claim 5 in the course of which process material vaporizes from said catalyst wherein an amount of fresh material selected from the group consisting of arsenic and oxide of arsenic is supplied to the reaction in admixture with the compound in an amount equal to the amount of said material which vaporizes from said catalyst.

7. A process as claimed in claim 5 wherein the arsenic containing oxidation catalyst is prepared by admixture of a material selected from the group consisting of arsenic and an oxide of arsenic with a molybdate of one of the catalyst metals.

8. A process as claimed in claim 5 wherein the arsenic oxidation catalyst is prepared by co-precipitation from mixed solutions of arsenic salts and a molybdate of one of the catalyst metals.

9. A process as claimed in claim 8 wherein the arsenic containing catalyst is prepared by co-precipitation from an aqueous solution containing arsenic ions together with molybdate ions and ions of one of the catalyst metals followed by thermal decomposition of the precipitate.

10. A process as claimed in claim 1 wherein the proportion of said compound in the feed is between 1 and 20% by volume.

11. A process as claimed in claim 1 wherein the concentration of oxygen in the feed is between 1 and 20% by volume.

12. A process as claimed in claim 1 carried out in the presence, as diluent, of a gas or vapour which is substantially inert under the conditions of reaction.

13. A process as claimed in claim 12 wherein the diluent is selected from the group consisting of nitrogen, propane, butane, isobutane, carbon dioxide, steam and mixtures thereof.

14. A process as claimed in claim 13 wherein the diluent is steam in concentration between 20 and 60% by volume of the feed.

15. A process as claimed in claim 1 wherein the temperature is between 300 and 500° C.

16. A process as claimed in claim 1 carried out with contact times in the range 1 to 30 seconds.

References Cited by the Examiner

UNITED STATES PATENTS

| | | | |
|---|---|---|---|
| 2,042,220 | 5/1936 | Groll | 260—531 |
| 2,744,928 | 5/1936 | Smith et al. | 260—530 |
| 3,087,964 | 4/1963 | Koch et al. | 260—530 |
| 3,190,913 | 6/1965 | Fetterly et al. | 260—533 |

LORRAINE A. WEINBERGER, *Primary Examiner.*

LEON ZITVER, *Examiner.*

R. K. JACKSON, I. R. PELLMAN, *Assistant Examiners.*